(12) United States Patent
Powell et al.

(10) Patent No.: US 7,954,519 B2
(45) Date of Patent: Jun. 7, 2011

(54) SAFE STORAGE OF VOLATILES

(75) Inventors: Michael R. Powell, Kennewick, WA (US); Matthew Fountain, Kennewick, WA (US); Anand Chellappa, Albuquerque, NM (US)

(73) Assignee: Intelligent Energy, Inc., Long Beach, CA (US)

( * ) Notice: Subject to any disclaimer, the term of this patent is extended or adjusted under 35 U.S.C. 154(b) by 1035 days.

(21) Appl. No.: 10/598,139

(22) PCT Filed: Feb. 18, 2005

(86) PCT No.: PCT/US2005/005134
§ 371 (c)(1),
(2), (4) Date: May 16, 2007

(87) PCT Pub. No.: WO2005/091845
PCT Pub. Date: Oct. 6, 2005

(65) Prior Publication Data
US 2008/0017524 A1    Jan. 24, 2008

Related U.S. Application Data

(60) Provisional application No. 60/546,304, filed on Feb. 19, 2004.

(51) Int. Cl.
*B65B 1/04* (2006.01)
*B65D 85/00* (2006.01)
*F17C 11/00* (2006.01)

(52) U.S. Cl. .......... 141/3; 141/11; 141/20; 141/64; 141/69; 206/0.7; 62/46.3

(58) Field of Classification Search ............ 141/2, 11, 141/20, 63, 64, 69, 98, 3; 206/0.7; 62/46.3, 62/371
See application file for complete search history.

(56) References Cited

U.S. PATENT DOCUMENTS

| | | | |
|---|---|---|---|
| 4,134,491 A * | 1/1979 | Turillon et al. | 206/0.7 |
| 4,259,846 A | 4/1981 | Rudolphi et al. | |
| 4,495,775 A * | 1/1985 | Young et al. | 62/46.3 |
| 4,598,836 A * | 7/1986 | Wessel | 206/0.7 |
| 6,539,726 B2 | 4/2003 | Giesy et al. | |
| 7,299,650 B1 * | 11/2007 | Romanos et al. | 62/371 |
| 7,712,605 B2 * | 5/2010 | Suzuki et al. | 206/0.7 |

OTHER PUBLICATIONS

International Search Report for PCT Application No. PCT/US05/05134.

* cited by examiner

*Primary Examiner* — Timothy L Maust
(74) *Attorney, Agent, or Firm* — Mark H. Krietzman; Baker & Hostetler, LLP

(57) ABSTRACT

Safe storage of volatile compounds or elements is provided by utilizing storage configurations that take advantage of the diffusibility and release characteristics of cell-based materials, such as foam materials. Such configurations may provide storage of hazardous, liquefied gases in closed-cell foam material. Release of gas/liquid from the foam is restricted by the need for the gas to diffuse through the closed cells. Because rapid release is prevented, storage safety is greatly improved.

8 Claims, 8 Drawing Sheets

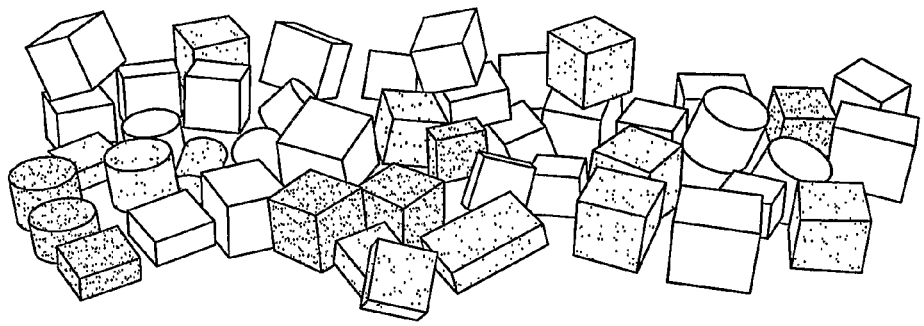
FIG. 2
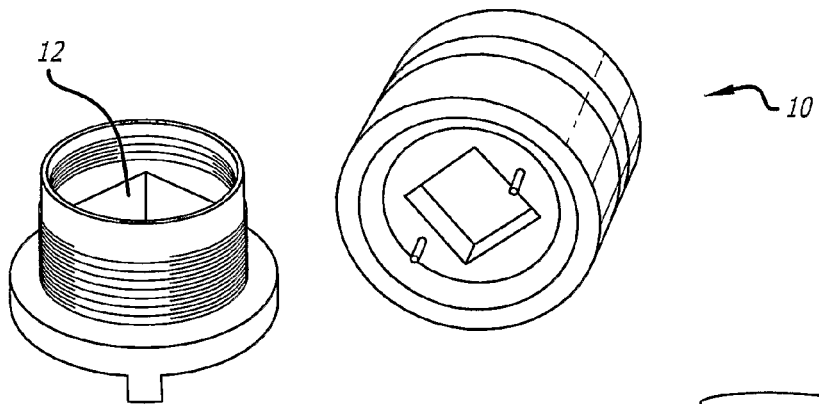
FIG. 3A
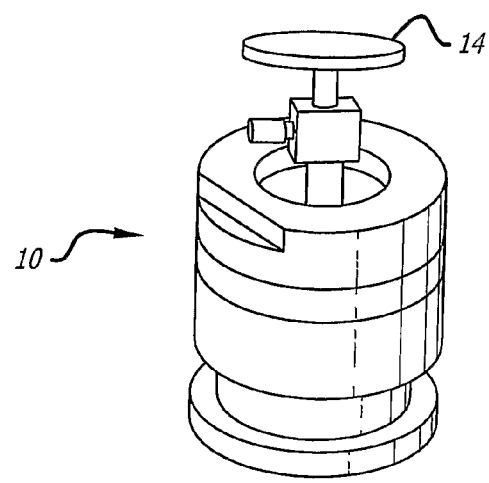
FIG. 3B
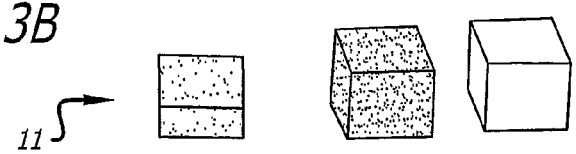

SAFE STORAGE OF VOLATILES

RELATED APPLICATION

This application is a national stage filing under 35 U.S.C. 371 of International Application PCT/US2005/005134, filed on Feb. 18, 2005, which claims the benefit of U.S. Application No. 60/546,304, filed on Feb. 19, 2004. The entire teachings of the referenced Application is incorporated herein by reference. International Application PCT/US2005/005134 was published under PCT Article 21(2) in English.

This application is related to and claims priority and benefit of U.S. Provisional Application No. 60/546,304, filed Feb. 19, 2004, entitled "Safe Storage of Volatiles".

STATEMENT REGARDING FEDERALLY SPONSORED RESEARCH OR DEVELOPMENT

The invention was made with Government support under contract No. DAAD19-00-C-0015 by the Department of Defense. The Government has certain rights in the invention.

BACKGROUND

1. Field of Endeavor

The invention relates generally to safe storage of compounds, in particular volatile compounds. In one aspect, the present disclosure relates to the use of foam-cell material to store volatile compounds. In another aspect, the present disclosure provides for the safe storage of a source from which hydrogen may be extracted.

2. Description of Related Art

Recent improvements in the design and manufacture of hydrogen/air fuel cells have increased interest in the use of fuel cells as a replacement for batteries and other power supplies (e.g., vehicle engines). Because hydrogen/air fuel cells can operate on very energy-dense fuels and are quiet and efficient, fuel-cell-based power supplies are considered a promising future power source. Many fuel cells operate using hydrogen gas for fuel, and oxygen (typically from air) as an oxidant. Unfortunately, reliable, convenient, and compact hydrogen sources do not yet exist, so fuel cells have yet to receive widespread commercial or military use. Fuel cells, however, represent relatively mature technology and are commercially available.

As discussed above, there is a great need and interest in hydrogen generators, including compact hydrogen generators, that extract hydrogen gas from a source. Examples of such sources/volatiles from which hydrogen may be obtained include, but are not limited to, butane, propane and anhydrous ammonia. As can be appreciated, use of hydrogen generators for providing hydrogen gas will likely be restricted unless the sources of hydrogen can be stored in a safe manner. For example, if anhydrous ammonia is the hydrogen source, a method and apparatus for storing ammonia must reduce and/or minimize the potential for a dangerous ammonia release if the integrity of the storage apparatus is compromised. Successful development of a safe ammonia-storage tank is beneficial because it facilitates rapid deployment of ammonia-based hydrogen sources for compact fuel-cell power supplies.

Several approaches are available for hydrogen generation and/or storage. These include hydrocarbon and methanol fuel reforming, hydrogen absorption into metal hydrides, hydrogen-generating chemical reactions, and ammonia decomposition (Blomen, L., and M. N. Mugerwa. 1993. Fuel Cell Systems. Plenum Press, New York; Bloomfield, D. P., V. J. Bloomfield, P. D. Grosjean, and J. W. Kelland. 1995. Mobile Electric Power. Analytic Power Corp., NTIS Report ADA296709). Adsorbent-based approaches offer reduced storage pressure, but often at a cost of vastly increased storage volume and mass.

Ammonia decomposition and ammonia-based chemical reactions are attractive methods for hydrogen generation because the required chemical reactors tend to be relatively small, simple, and easy to control. Ammonia decomposition has received relatively little attention, however, because of ammonia's toxicity and foul odor, and because it is generally not economical for power production except in remote, low-power applications (Appleby, A. J., and F. R. Foulkes. 1989. Fuel Gel/Handbook Van Nostrand Reinhold, New York). In spite of these drawbacks, hydrogen from ammonia is attractive for at least two reasons: (I) The usable hydrogen per kilogram of fuel is relatively high; and (2) ammonia-based fuel-cell systems can be deployed much sooner than the more complicated hydrocarbon-based fuel reformers.

Before ammonia-based hydrogen generators will gain acceptance, the problem of safe ammonia storage must be addressed. Ammonia is a toxic gas that can rapidly damage the eyes and respiratory tract upon exposure to concentrations in the range of about 500-1000 ppm. Exposure to higher concentrations (>5000 ppm) even for short periods can lead to respiratory failure and death (Nielsen, A. 1995. Ammonia: catalysis and Manufacture. Springer-Verlag. London). An ammonia-based hydrogen generator operating in an enclosed environment must not have the potential for rapid ammonia release, as this may be harmful or even deadly for surrounding personnel.

The ammonia-based hydrogen generators currently under development (e.g., Powell, M R. M S Fountain, C J Call, A S Chellappa. 2002. "Ammonia-Based Hydrogen Generation for Fuel Cell Power Supplies." Army Science Conference 2002, Orlando, Fla. Dec. 2-5, 2002) employ lightweight storage tanks made from either aluminum or titanium. These tanks have a mass of approximately 120 g and an ammonia storage volume of about 0.7 liters. The tanks are designed to withstand >1000 psig to ensure they do not burst in response to ammonia vapor pressure, which can exceed 250 psi at temperatures greater than 40° C. However, the storage tanks are not designed to withstand punctures from sharp objects or projectiles such as bullets. Further, there is the possibility for failure of tubing and/or reactor components downstream of the ammonia-storage tank, all of which could result in rapid release of ammonia. Before ammonia-based hydrogen sources can be widely marketed, the ammonia storage tanks must be improved to guard against rapid ammonia release in the event of tank puncture.

Currently, safe storage of ammonia (and other selected hazardous liquefied gases) requires use of relatively heavy, thick-walled tanks or loading the ammonia onto high-capacity adsorbents. The storage units in both approaches are heavy and result in undesirable increases in mass of end-use systems such as hydrogen generators for fuel cells. For example, an ammonia-storage system with a 500-gram capacity will have a total mass of about 2000 g or more (capacity<20 wt.-%) if a standard storage tank is used. If an adsorbent is used instead, the mass of adsorbent is expected to be at least three times the mass of ammonia stored, so the resulting storage system will have a mass greater than 2000 g (capacity<20 wt.-%).

Monolithic storage structures for gases have received relatively little attention in the literature. This is largely because there is not a perceived need for the ability to store small quantities of toxic or flammable gases under pressure in a small volume. Propane and butane are sold commercially in small quantities as liquids, but safety concerns are mitigated through the use of a heavy storage vessel and warnings regarding indoor storage and use of the fuel. As compact, lightweight fuel-cell power systems become more prevalent, however, greater emphasis is expected on the need to safely store small quantities of these materials for indoor use.

Some work along these lines has been performed at the Oak Ridge National Laboratory as part of a program to develop passenger vehicles that can run on natural gas. Storage of the natural gas is the principal obstacle to these vehicles because natural gas cannot be liquefied under ambient temperature conditions. Burchell and Rogers (2000) (Burchell, T. and M. Rogers. 2000. "Low Pressure Storage of Natural Gas for Vehicular Applications." SAE Technical Paper Series. 2000-01-2205. SAE, Warrendale, Pa.) report on a monolithic storage structure utilizing adsorption of natural gas. Adsorbent fibers are configured into a monolithic block with high adsorption capacity and high thermal conductivity, which are both desirable properties for the vehicle application (high thermal conductivity allows rapid filling of the adsorbent without overheating).

In particular, this prior art approach, however, is not likely to be of use for safe ammonia storage. Adsorbent-based approaches suffer from relatively low ammonia storage density and the need to provide heat to desorb the ammonia from the adsorbent. Further, this adsorbent monolith has a high thermal conductivity, which is counter-productive for safe ammonia storage. Low thermal conductivity of the storage matrix is preferred to help retard vaporization of volatiles, for example ammonia, from the monolith. If heat cannot quickly reach the vapor-liquid interface, volatilization of ammonia will be slowed.

SUMMARY

We have examined a variety of methods for improving the safety of storing volatile compounds. One aspect of the disclosure involves storing the volatile compound inside a low-permeability, high-void-fraction, monolithic structure such as a closed-cell foam. In particular embodiments, such foam may be a ceramic foam. In another aspect, the volatile can be at least one of ammonia, butane and propane. This approach offers very high storage density, compact size, and a controlled release rate for the volatile even in the event of tank puncture. Rapid release of the volatile from the foam monolith is controlled by thermal and mass-transfer effects. To escape the monolith, the volatile must permeate through the cell walls to near the surface of the monolith. Experiments described in the disclosure provide evidence that this is a viable concept.

Tests demonstrate that closed-cell foam materials offer a promising method for improving the safety of volatile compound storage, particularly for ammonia storage.

In an aspect, the present disclosure provides for the safe storage of ammonia utilizing monolithic, closed-cell foam materials, which offer the desired characteristics of compact and lightweight ammonia storage with relatively little safety risk. Lightweight, closed-cell foam materials will be used to fill an ammonia-storage tank and thereby reduce the rate of ammonia release in the event of tank failure.

The disclosed closed-cell foam approach results in very little increase in mass and volume over that of the pure liquid ammonia.

In addition to storage of ammonia, this approach may have other applications related to the safe storage of other toxic and/or flammable liquefied gases such as butane and propane. Possible alternative applications of such storage configurations will make possible personal heaters for skiing and other cold-weather activities.

In accordance with one aspect of the disclosure, a method for storing volatiles under pressure is disclosed that includes providing a storage apparatus where the storage apparatus includes an outer portion and a foam component. The foam component is contained and disposed within an inner space defined by the outer portion. The storage apparatus is then connected to a source, such as a tank, for providing a volatile compound and the volatile is then conducted from the source into the storage apparatus, whereby the voids of the foam component have the volatile compound conducted thereto. In particular aspects, foam component includes closed cells with low, but nonzero, cell-wall permeability. The volatile compound can be at least one of a liquid or gas or combination thereof. Exemplary volatiles can include, but are not limited to, at least one of ammonia, butane and propane or any combination thereof.

In particular embodiments, at least a portion of a surface of the foam component is sealed.

In accordance with another aspect of the disclosure, an apparatus for storing volatile compounds is disclosed, comprising an outer portion, the outer portion defining an inner volume of the apparatus, and a foam component, where the foam component is disposed and contained within the inner volume defined by said outer portion of the apparatus. The apparatus comprises means for introducing at least one volatile compound into the inner volume containing the foam component. In particular embodiments, the foam component includes closed cells. In some embodiments the outer portion of the apparatus is composed of at least one of a metal, alloy or plastic or any combination thereof.

In one aspect, the foam component utilized and disclosed herein has a void fraction of about greater than about 60%. In some embodiments, the apparatus further comprises a sealing component disposed upon at least a portion of the foam component. A flexible elastomer can be utilized as a sealing component, for example.

In particular embodiments, the foam component is provided with at least one channel.

In another aspect, an apparatus for storing volatile compounds in accordance with the teachings of the present disclosure employs a foam component whose geometry is cylindrical, spherical, or planar. In some embodiments, apparatus can be composed of several disclosed storage apparatus which can be manifolded together to increase volatile delivery rate, wherein a safe delivery rate of each device/apparatus is maintained. In some embodiments, the storage apparatus is arranged in a stacked fashion, thus providing cartridges and is further enclosed in an outer enclosure containing suitable inlet and outlet fittings. In particular embodiments, manifoldable devices allow for charging of volatiles of one or more cartridges or storage apparatus while allowing discharge of a volatile from one or more other cartridges or storage apparatus. In some such embodiments, a provided configuration permits replacement of one or more cartridges or storage apparatus while one or more other cartridges or storage apparatus are delivering volatiles to an end-use system.

In particular embodiments, the disclosed apparatus can be air cooled or liquid cooled to improve charging rates.

In another aspect, the apparatus and methods disclosed herein can be utilized and provided in accordance with and part of an end-use system. An exemplary end-use system can include a hydrogen generator. Another exemplary end-use system is a fuel cell power system.

The teachings of the present disclosure provides for storage of hazardous, liquefied gases in a closed-cell foam material. Release of gas/liquid from the monolith is restricted by the need for the gas to diffuse through the closed cells. Because rapid release is prevented, storage safety is greatly improved. The mechanical strength of the foam monolith provides pressure resistance to the liquefied gas pressure. A tank can be formed by sealing the external surface of the monolith, resulting in a storage system that is very lightweight and safe. Control of the gas release rate can be achieved not only via adjusting foam properties, but also by adjusting the foam monolith geometry. For example, holes can be drilled into the monolith to provide for an increase in surface area that will increase the gas release rate. Alternatively, portions of the monolith surface can be sealed with an impermeable layer thereby decreasing the gas-release rate. The gas release process is approximated by diffusional loss, so geometries expected to increase the rate of gas diffusion out of a monolith (e.g., those with high surface-area-to-volume ratios) will also increase the rate of gas release from the foam-based monolithic gas storage structure.

In addition to markets for safe storage of ammonia, niche markets for safe storage of small quantities of other hazardous and flammable liquefied gases are anticipated. Most butane-powered consumer devices are currently not allowed onboard commercial aircraft due to the potential for an in-flight fire. Development of a method to restrict butane release rate in accordance with the teachings of the present disclosure, for example, may result in some of the devices being allowed. Other applications include personal heaters, which are not widely marketed in part because of the risks associated with carrying a pressurized flammable gas in proximity to a flame or catalytic burner. Elimination of the possibility for catastrophic failure of volatile storage apparatus, such as a butane/propane storage tank, would greatly improve the commercial viability of these devices. Further, when hydrocarbon-based fuel reformers become available, safe storage media will be a priority for compact applications designed for indoor use.

FIGURES

Descriptions of exemplary embodiments are provided and reference made to the accompanying figures which form the part thereof, and in which are shown by way of illustration of specific embodiments. It is to be understood that other embodiments may be utilized and structural and functional changes may be made without departing from the scope of the present disclosure.

FIG. 2 depicts exemplary samples of useful foams;

FIG. 3A is an exemplary testing apparatus in an open configuration;

FIG. 3B is the exemplary testing apparatus of FIG. 3A in a closed configuration;

Figure 12:
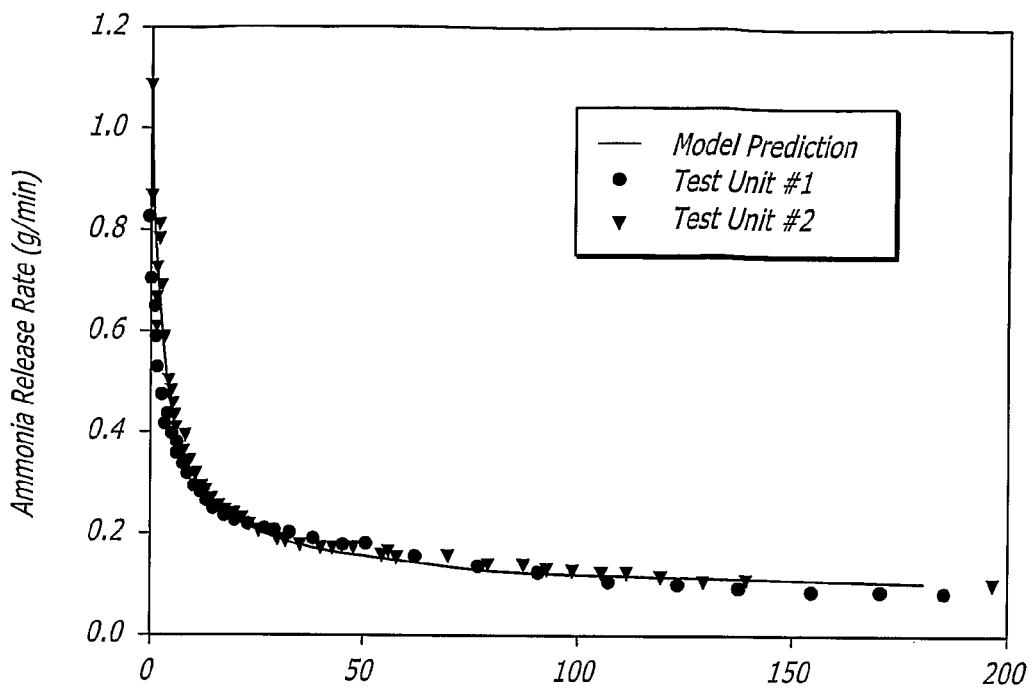
Figure 13:
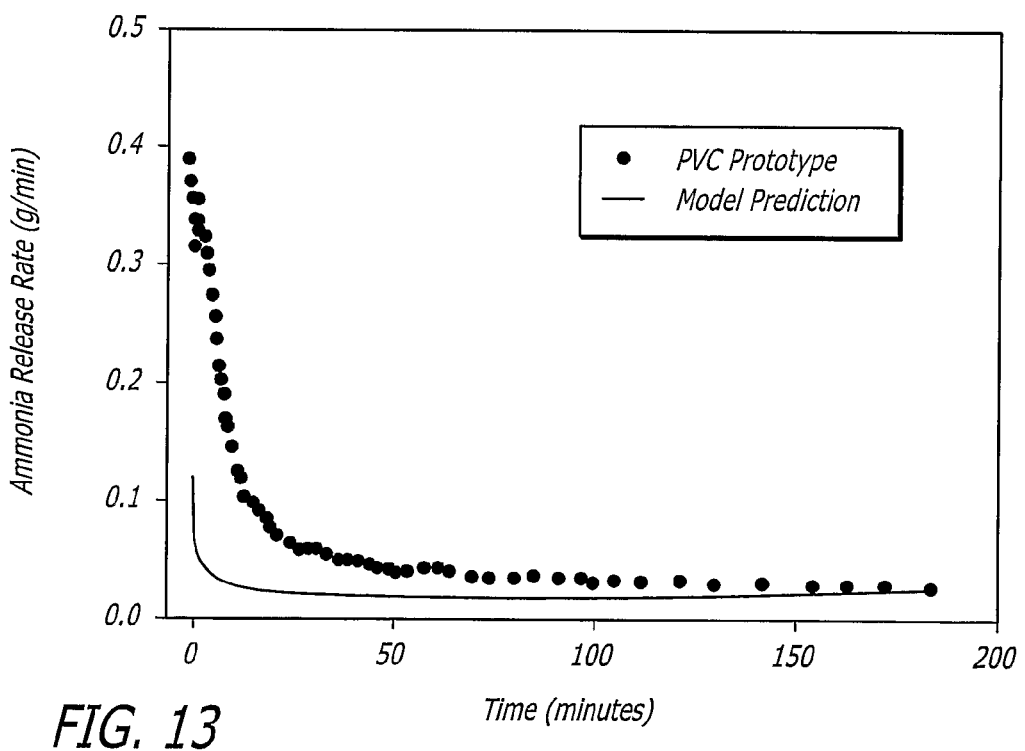
Figure 14:
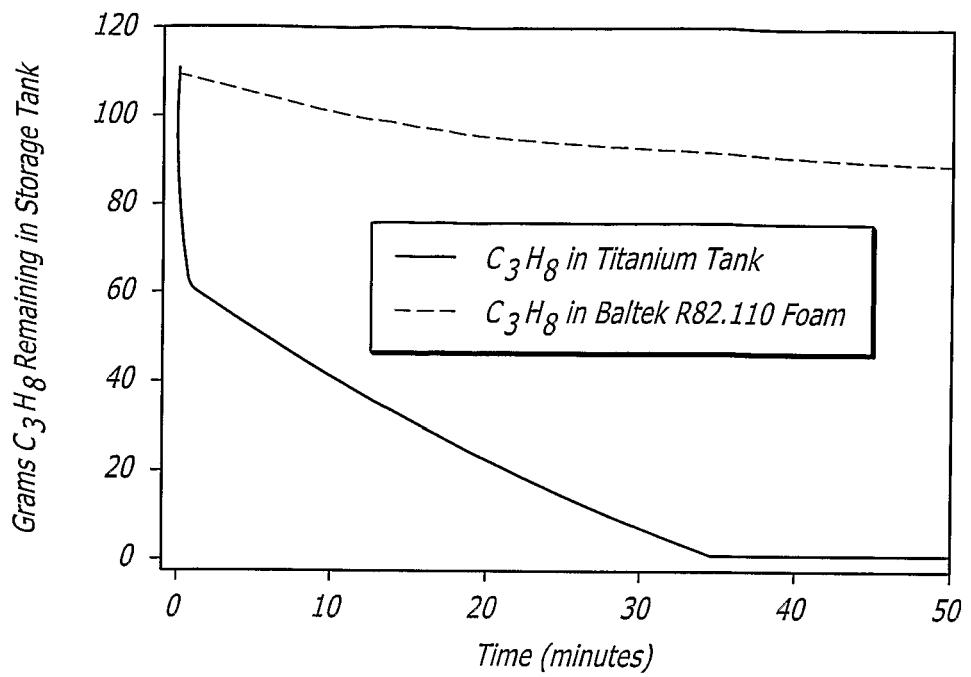
Figure 15:
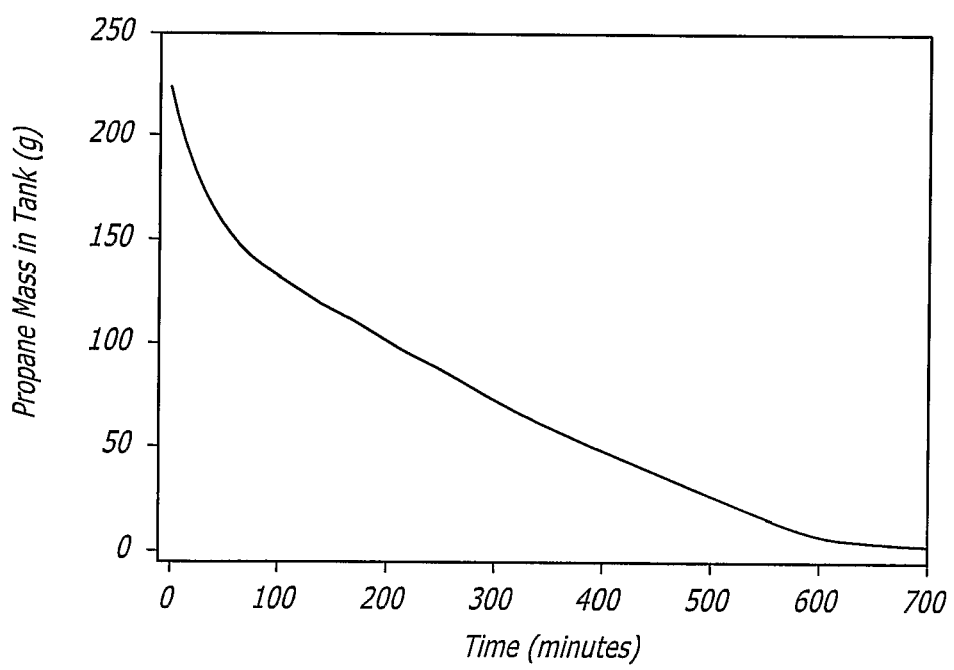

FIG. 12 reports exemplary release rate data for a steel storage apparatus embodiment;

FIG. 13 reports exemplary release rate data for a PVC storage apparatus embodiment;

FIG. 14 illustrates exemplary volatile release rates in accordance with an aspect of the present disclosure; and FIG. 15 illustrates exemplary release of propane in accordance with the present disclosure.

DETAILED DESCRIPTION

The foregoing is a description of preferred embodiments and has been presented for the purpose of illustration and description. It is not intended to be exhaustive or to limit the present disclosure in any way. Many modifications and variations are possible in the light of the teachings provided herein.

Figure 1:
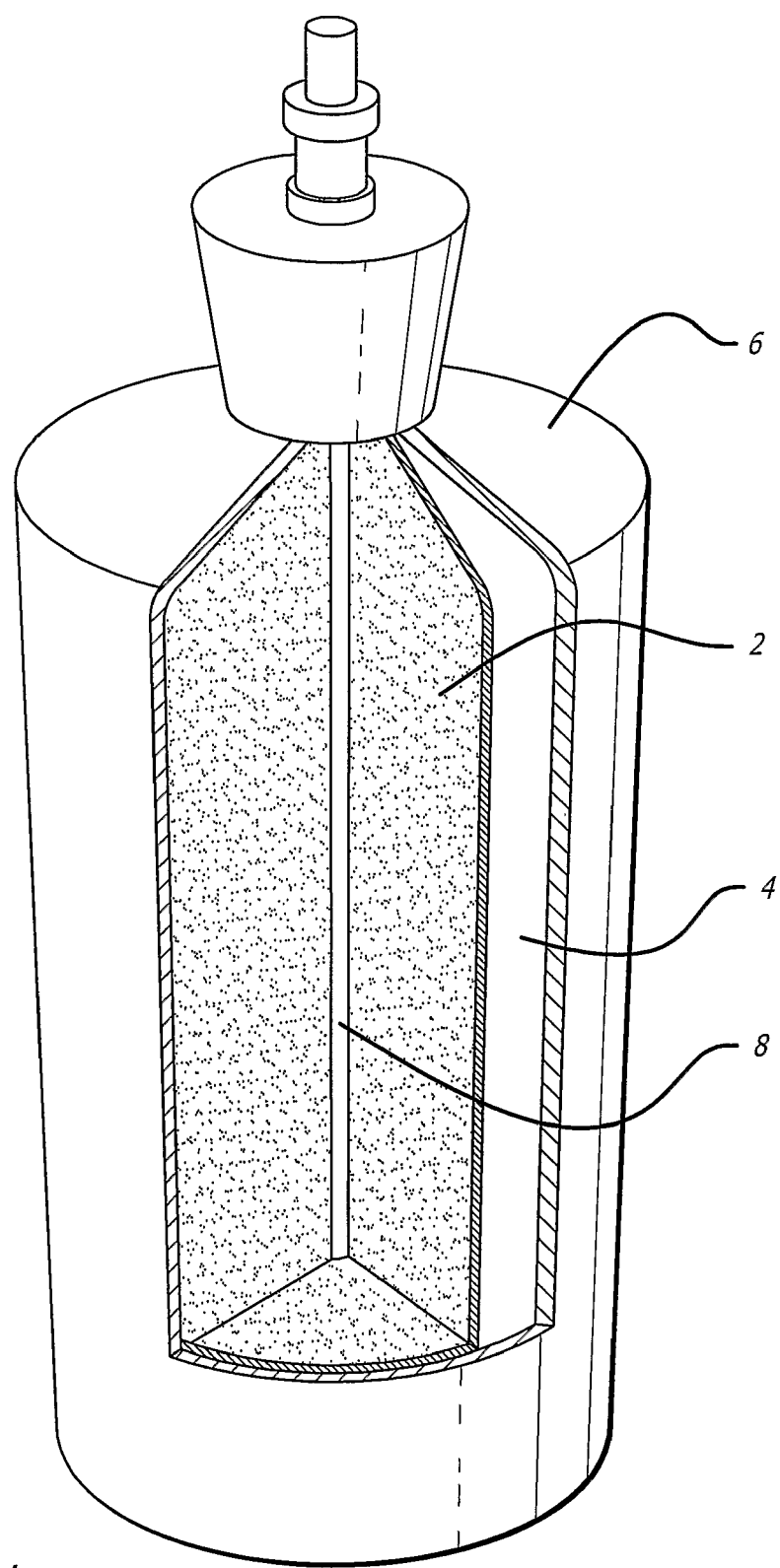
FIG. 1 is an exemplary embodiment of a volatile storage apparatus in accordance with one aspect of the disclosure.

Turning to FIG. 1, an exemplary configuration of a closed-cell-foam-based volatile storage vessel is depicted. In this exemplary embodiment, the volatile stored is ammonia. The closed-cell monolith 2 (foam) is surrounded by a flexible elastomer 4, such as Buna Nitrile or Neoprene (synthetic rubber based on polychloroprene, as known in the art), which are compatible with ammonia. The elastomer layer/sheet 4 protects the monolith 2 against damage from vibration and fills the gap between a titanium tank shell 6 and the monolith 2 to prevent accumulation of liquid ammonia outside the monolith 2. Small-diameter holes, such as fill/drain hole 8, penetrate through the monolith 2 to allow a relatively stable release rate from the monolith 2 and to facilitate filling the monolith 2 with liquid ammonia.

A closed-cell foam with high void fraction (e.g., 80% or higher) can be used for safe ammonia storage. Lower-void-fraction foams can also be used, but the resulting storage density will be reduced.

An alternative embodiment involves coating a monolith 2 of closed-cell foam with an impermeable layer (e.g., bonded metal foil, epoxy, or fiberglass). The sealing layer can be very thin because it is well supported by the monolith 2. Even a very thin impermeable layer (e.g., 50 to 100 microns) will provide adequate pressure resistance. Because the layer can be so thin, the resulting mass of the storage system is very low. That is, the external enclosure, such as a titanium canister, can be eliminated.

The closed-cell monolith approach, however, can store, for example, about 500 g of ammonia with perhaps about 200-400 g of monolith 2. The resulting system mass could be as low as about 750 g if the monolith surface is sealed using a thin, impermeable layer that obviates the need for an external metal enclosure, resulting in a storage capacity of about 67 wt.-%, which is more than a 3× improvement in capacity over prior art storage methods. Even if a thin-walled, metal storage tank is required, the resulting mass is expected to be less than about 1000 g, resulting in a storage capacity of at least 50 wt.-% which is more than a 2× improvement in capacity over prior art storage methods.

An aspect of the present invention utilizes closed-cell monoliths for volatile compound storage, including ammonia storage. Liquid ammonia is stored inside the spherical cells of a high-void-fraction foam monolith. Release of ammonia is restricted by two effects. First, ammonia release is restricted by the cell walls; ammonia must permeate through the cell walls to escape the monolith. Proper selection of monolith properties and geometry allow control of the ammonia release rate. The targeted accidental release rate is about 0.18 g/min of ammonia, which should allow sufficient time for evacuation of personnel and/or execution of other safety protocols to ensure the safety of personnel and end-use equipment. Second, the foam serves to restrict heat flow through the ammonia so in the event of a sudden depressurization, a relatively small fraction of the ammonia will flash to vapor because heat from the bulk of the ammonia cannot be rapidly transported to the vapor/liquid interface where evaporation takes place.

Closed-cell foam materials can withstand surprisingly high internal pressures without failure due to the effect of small curvature radii on pressure-induced tensile stresses. This effect is described by the Young-LaPlace equation, which is (Hiemenz, P C. 1986. Principles of Colloid and Surface Chemistry. 2nd ed. Marcel Dekker, Inc. New York):

$$\Delta P = (2\sigma_E)/R$$

where $\Delta P$ is the pressure difference between the inside and outside of the spherical shell, $\sigma_E$ is the elastic stress in the shell, and R is the radius of curvature of the sphere. For a constant $\Delta P$, the resulting stress decreases in direct proportion to the reduction in radius of curvature. Most people have experienced the Young-LaPlace effect while inflating rubber balloons. The balloon requires considerable effort to begin the inflation even though the rubber is under relatively little tension (i.e., the rubber is not yet stretched). A high initial inflation pressure is required because the balloon's radius of curvature is small. As the balloon radius increases, the elastic tension in the rubber surface also increases, but the pressure required to maintain the tension decreases. Somewhat surprisingly, the internal pressure of a half-inflated balloon is higher than that of a fully inflated balloon.

The implication of the Young-LaPlace equation for foam-based storage of volatiles, including ammonia, is that even very thin (and relatively fragile) cell walls can resist the >100 psia vapor pressure of ammonia if the cells are small. This is fortunate because to keep the ammonia storage density high, a high void fraction (about >80%) foam is desired that will necessarily have relatively thin cell walls. The required cell size depends on the strength of the cell walls, but typically cell diameters must be less than about 5 mm and preferably less than 0.5 mm.

A variety of closed-cell materials have been studied. In one embodiment, the exemplary DIAB Group (DeSoto, Tex.) Divinycell H200 foam (H200), was selected for further testing and use.

The void spaces in closed-cell insulating foams are often filled with low-thermal-conductivity gases to improve overall thermal performance. Over time, these gases can diffuse out of the insulation and air gases (e.g., nitrogen, oxygen, and water vapor) diffuse into the insulation. The rate at which this gas exchange takes place determines the useful life of the closed-cell foam insulation. Pilon et al. (Pilon, L., A. G. Fedorov, and R. Viskanta. 2000. "Gas Diffusion in Closed-Cell Foams." Journal of Cellular Plastics. 36:451-474) developed a mathematical model of gas release from insulating foams in which the effective diffusivity of the diffusing gas is related to the foam void fraction and cell size as well as the diffusion rate of the gas through the continuous phase of the foam.

Pilon's derived expression for the effective diffusivity ($D_{eff}$) is:

$$D_{eff} = \frac{1}{n}\left(1 + \frac{\phi}{1 - \sqrt[3]{\phi}}\right) D_{c,0} \exp\left(\frac{-E_c}{RT}\right)$$

where n is the number of cells across the foam thickness in the direction of the diffusion flux, $\phi$ is the void fraction, $D_{c,0}$ is the diffusivity of gas through the continuous phase, $E_c$ is an activation energy term, R is the gas constant, and T is absolute temperature. As expected, decreasing the cell size (i.e., increasing n) or decreasing the void fraction results in a decrease in the effective diffusivity.

The H200 foam tests prove the concept of controlling the ammonia release rate to the desired levels through the use of a closed-cell foam material. Storage of ammonia, as well as other volatiles, in closed-cell monolithic foams is desirable and illustrated for the following exemplary reasons:

1) High volumetric density: Ammonia can be stored inside the closed-cell foams with very little increase in overall volume. With void fractions of about 0.80 and higher, the volume increase is only about 25% over that of liquid ammonia.

2) High mass density: Because the ammonia is stored in a lightweight matrix, there is relatively little mass increase compared with storage of liquid ammonia in an empty steel-type tank. When loaded to 0.45 g $NH_3$/$cm^3$ of foam, the H200 foam results in only a 45% mass increase compared with liquid ammonia. Since the density of the H200 foam is 0.2 g/$cm^3$, the storage capacity of the foam is nearly 70 wt.-%, which is approximately seven times greater than the 10 wt.-% maximum capacity typical of prior-art, adsorption-based, ammonia storage methods.

3) Simple and Versatile: Storage of ammonia in a foam material does not require heat (other than ambient) to supply ammonia to ammonia-based hydrogen generators, for example. Further, ammonia can be delivered at high pressure (about 70 to 100 psig) from the foam monolith so there is sufficient pressure available to supply an ammonia-decomposition reactor with an integral hydrogen-separation membrane. Ammonia at the desired pressure can be supplied by incorporating a suitable throttling valve or pressure regulator in the vessel or in the end-use system.

The development of a safe volatile storage system, is described below.

Identification of Candidate Closed-Cell Foam Materials

A variety of different materials were identified as possible volatile compound storage media, for use as, in one example, ammonia-storage media. The general classes of materials examined are listed below. Samples of each material were tested to determine their ability to restrict the release of ammonia. The materials collected for this effort included:

Alumina Ceramic Foam: Six different alumina foam formulations were obtained from Cellaris Ultralight Ceramics, Ltd. (D. N. Misgav, Israel). These foams are formed via a patented process that involves binding together hollow spheres of alumina.

Silicon Oxycarbide Foam: Professor Palo Colombo (Dept. of Material Science, University of Bologna, Italy) has developed a technique for creation of lightweight foams using silicon oxycarbide ceramics. These foams have a closed-cell structure with small "window" openings in the cells that allow gas flow between adjacent cells.

Aluminum Foam: Samples of closed-cell 6061 alloy aluminum foam were obtained from Porvair Advanced Materials (Hendersonville, N.C.). Aluminum foam samples were also obtained from Cymat (Mississauga, Ontario, Canada), Fraunhofer USA (Newark, Del.), and Gleich (Kaltenkirchen, Germany).

Syntactic Foam: Samples of SynSpand® were obtained from Loctite Aerospace (Bay Point, Calif.). Synspand® is a closed-cell expanding syntactic foam for custom density-to-strength ratios in honeycomb core and cavity filling. This product is supplied in thin-film sheets which are expanded and cured by controlling temperature and ramp rate.

Glass Microspheres with Ceramic or Cementitious Binders: A variety of high-void-fraction, foam-like materials were prepared from mixtures of glass and plastic micro-balloons with ceramic particles or cementitious binders such as portland cement and plaster of Paris.

Glass Foam: Samples of Pittsburgh Corning FoamGlas HLB1600 insulation were obtained. This material is used as a high-temperature insulator, has good chemical resistance, high void fraction, and low density (0.163 g/cm$^3$).

Polymeric Foams: Structural foam materials made from a variety of polymeric materials were also tested. The DIAB H200 foam, which we have selected as an exemplary foam in various embodiments disclosed herein, is a structural polymeric foam. Its mechanical properties are similar to those of wood, yet its density is only 0.2 g/cm$^3$.

Ceramic/Carbon Foam: Mixtures of ceramic and carbon particles were fired to 1100° C. under nitrogen to sinter the ceramic particles without burning away the carbon. The samples were then fired at 500° C. under air to burn away the carbon, thereby leaving a ceramic foam with high void fraction.

Graphite Foam: Samples of graphite foam were obtained from Poco Graphite, Inc. (Decatur, Tex.).

In excess of 100 samples were obtained from vendors or prepared. FIG. 2 shows some of the samples collected for this effort, provided in various geometric forms for testing.

In some cases, butane or propane was used for gas-release tests.

A sample-testing apparatus 10, provided having two halves threaded to fit each other, was designed and built from 6061 aluminum alloy, which has adequate ammonia corrosion resistance. This test cell is shown in FIGS. 3A and 3B. The cube-shaped sample chamber 12 is 3 cm on each edge. Gas is allowed to escape through a ⅛"-dia hole (not shown) in the top of the unit. This hole can be closed using a valve 14, such as a three way valve, for example, shown on the top of the sample testing apparatus 10 in FIG. 3B (some exemplary foams 11 are illustratively represented).

Each foam sample was cut to fit inside the 3-cm cubic volume sample chamber inside the test apparatus. Once the sample was secured inside the test apparatus, air was pumped out of the apparatus using a vacuum pump. Pressurized butane or ammonia was then connected to the 3-way valve, such as valve 14, to infuse the foam sample with gas/liquid. The mass of the unit was periodically measured to determine the mass of ammonia or butane infused into the simple. Once the mass was stable (implying the foam monolith was filled), the apparatus was inverted and drained of excess liquid without releasing a significant quantity of gas. The test apparatus was then placed on an electronic balance and the valve opened to the atmosphere. As the gas escaped, the resulting mass loss was observed and recorded.

Figure 4:
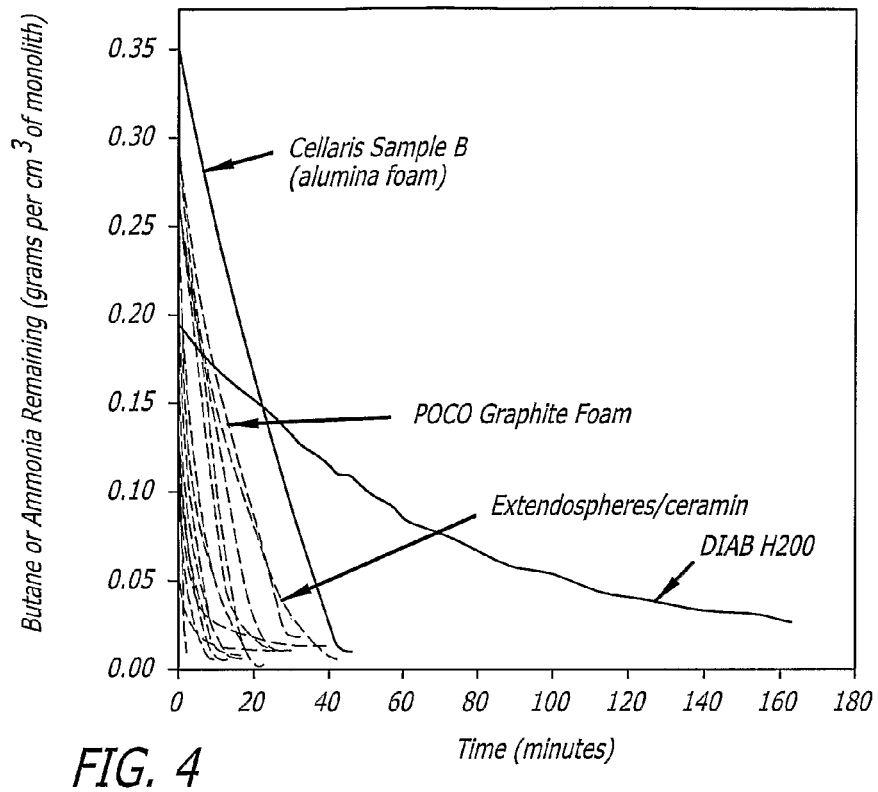
FIG. 4 depicts exemplary ammonia and butane release data.

FIG. 4 shows the test results for a variety of exemplary foam monolith samples. The exemplary (polyvinylchloride "PVC") polymeric foam, DIAB H200 foam (from DIAB Technologies, DeSoto, Tex.), exhibited a much slower gas-release rate than any other material tested. The H200 data were collected using ammonia. Comparing the experimentally observed release rates with the numerical-model predictions, the effective diffusivity of most samples ranged from $10^{-5}$ to $10^{-7}$ m$^2$/s. The H200 foam, however, has an estimated effective diffusivity of only $1.8 \times 10^{-9}$ m$^2$/s.

The ammonia-release data for the DIAB H200 sample shown in FIG. 4 indicates an initial ammonia loading of 0.20 g NH$_3$ per cm$^3$ of foam. Other tests (e.g., tests shown in FIG. 7) have demonstrated higher ammonia-loading densities. Based on the known void fraction of the H200 foam (0.84) and the density of liquid ammonia at room temperature (0.6 g/cm$^3$), it should be possible to achieve a loading of 0.5 g NH$_3$/cm$^3$. This has been confirmed experimentally where loadings of up to 0.50 g NH$_3$/cm$^3$ have been achieved. Predicted ammonia-storage densities based on ammonia loadings of 0.25 and 0.45 g NH$_3$/cm$^3$ are provided.

Several foams were tested using both butane and ammonia. The release rate (g/min) was found to be similar for both gases. Ammonia has a higher vapor pressure than butane, but it also has a higher heat of vaporization, which serves to slow the release. These two effects appear to largely cancel each other out.

The H200 foam has very attractive ammonia-release characteristics; its effective diffusivity is low enough to prevent rapid ammonia release, yet high enough to allow the target feed rate of about 0.12 g/min to about 0.18 g/min. Of course, alternative applications will have different target rates, so that a release rate (g/min) with a reasonable monolith surface area can be selected, that is, a surface area is provided/selected in conjunction with a selected volatile to provide a desired release rate. The H200 foam also appears to have adequate chemical resistance for the ammonia-storage application. H200 is composed of polyvinyl chloride (PVC) and polyurea.

DIAB Technologies (DeSoto, Tex.) has conducted "solvent resistance" tests in which samples of H200 foam were exposed to various solvent atmospheres for 28 days. Tests using ammonia indicated the foam compressive strength decreased by about 17% over this period. This result implies ammonia affects the foam matrix, but the relatively small 17% decrease implies the effect is minor.

Figure 5:
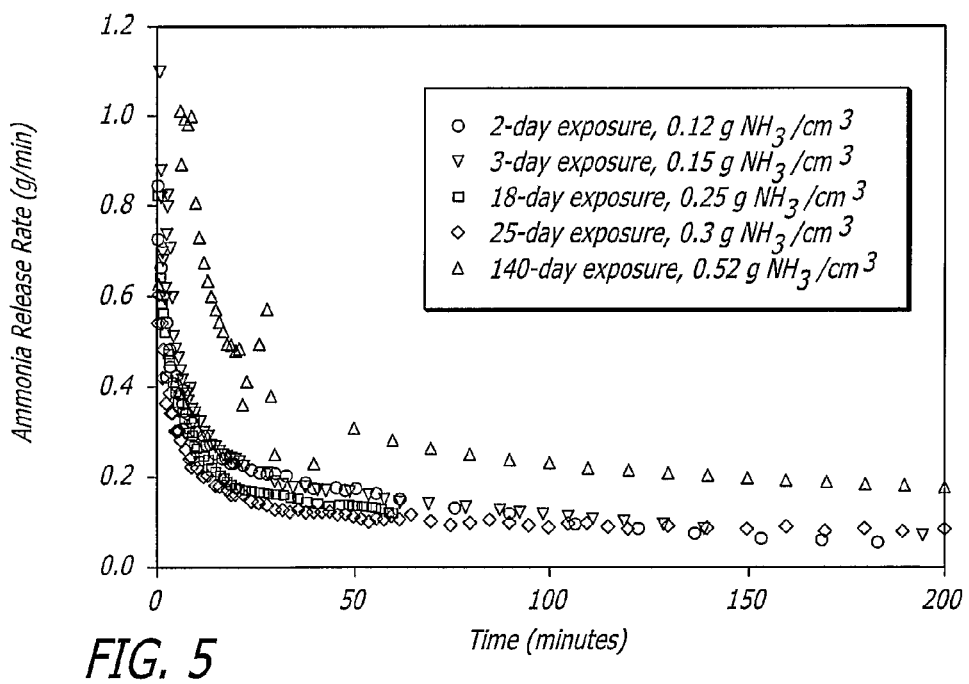
FIG. 5 depicts an example of ammonia release from exemplary H200 foam.

Testing has not revealed evidence for rapid degradation of the H200 foam upon exposure to ammonia. FIG. 5 shows the ammonia release-rate data for multiple tests using the same piece of H200 foam. Ammonia release was evaluated following exposure times ranging from 2 days to 140 days. After 140 days of exposure to liquid ammonia, the release rate was found to be roughly twice that of samples exposed for 25 days or less. The fact we do not observe a rapid degradation of the foam's ability to restrict ammonia release shows that a polyvinylchloride foam, such as H200 foam, can be used for safe ammonia storage for a period of at least several months.

Thus far, all tests have been conducted at about room temperature (about 21-23° C.). Ammonia release is expected to be reduced at lower temperatures principally because the vapor pressure of the stored ammonia will be reduced. At 5° C., the ammonia vapor pressure is roughly half of the room-temperature value. The lower pressure driving force at lower temperatures is expected to reduce the ammonia release rate. The ammonia release rate depends on the interaction of the ammonia vapor pressure as well as its diffusivity and solubility in the PVC/polyurea that comprises the exemplary H200 foam.

Figure 6:
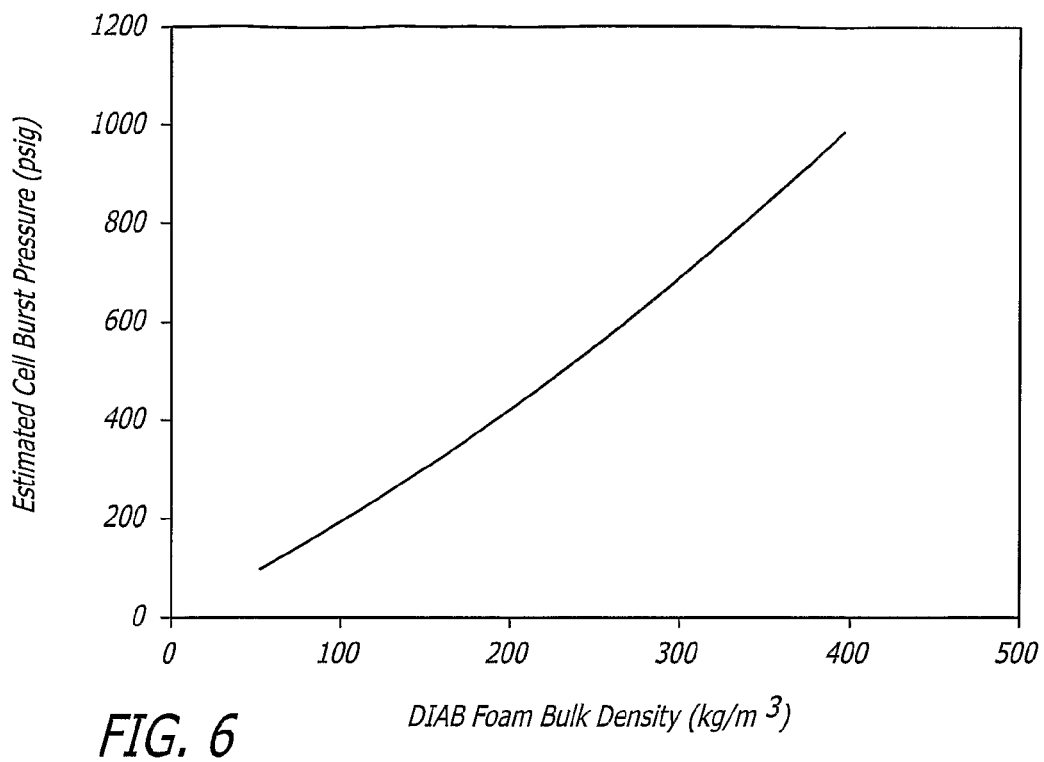
FIG. 6 depicts predicted internal pressure resistance.

By similar reasoning, higher temperatures are expected to increase the ammonia release rate. As the temperature increases, however, it should be considered that there is the possibility the ammonia vapor pressure could exceed the mechanical strength of the foam and result in rupture of the cell walls. To evaluate this possibility, we calculated the tensile stress in the walls of a 0.3-mm-dia. hollow sphere which is the mean cell size in the exemplary H200 foam. The wall thickness was determined as a function of the foam bulk density, and the mechanical properties of PVC were applied (7000 psig tensile strength, 1250 kg/m$^3$ density). The calculation results are shown in FIG. 6. The cells in the exemplary H200 foam (bulk density=200 kg/m$^3$) are predicted to burst at 420 psig, which is equal to the vapor pressure of ammonia at 65° C. The H200 foam will likely experience failure at a pressure somewhat lower than 420 psig because of reduced foam strength at higher temperatures and the fact that the cells are not exactly spherical. If greater pressure resistance is required, however, other exemplary foams with bulk densities of up to 400 kg/m$^3$ are available and may be utilized. As shown in FIG. 6, the pressure resistance of H400 foam (density of 400 kg/m$^3$) is predicted to be more than twice that of the H200 foam (960 psig vs. 420 psig).

Figure 7:
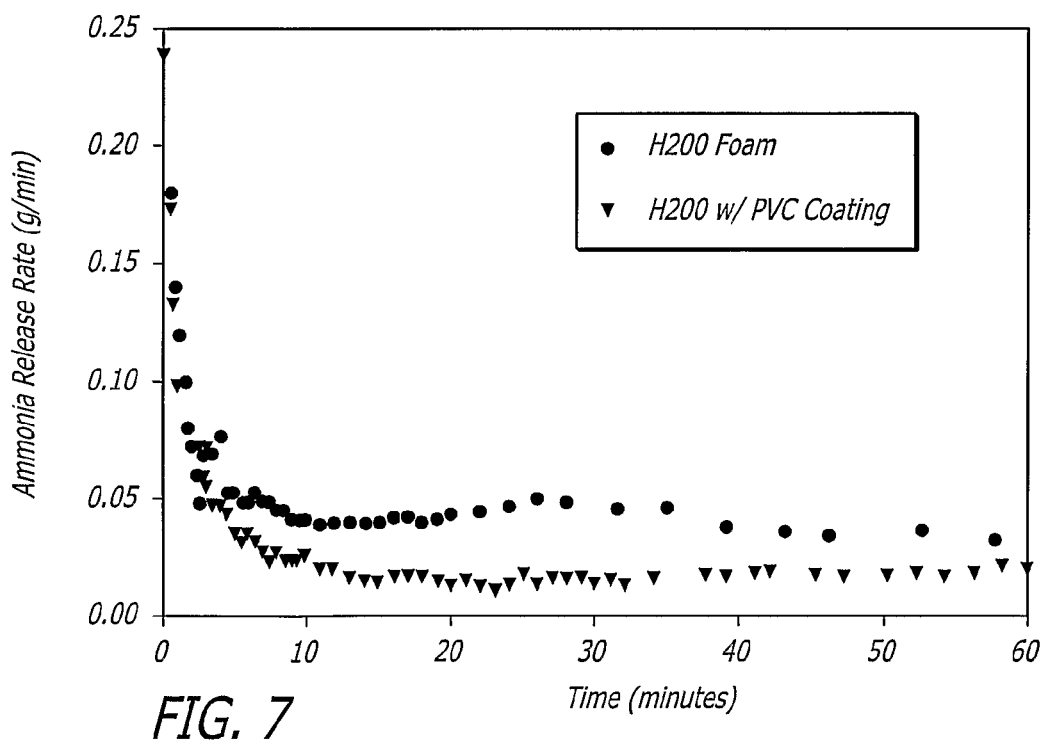
FIG. 7 is a chart showing the effect of covering a foam surface on a release rate.

It is useful to have control over the ammonia release rate via additional methods other than adjusting the foam properties (void fraction and cell size). Ammonia release from a foam monolith can be reduced simply by sealing a fraction of the monolith surface with an impermeable (or slightly permeable) barrier. This technique was demonstrated using a sample of H200 foam. FIG. 7 shows the ammonia release rate for H200 foam compared with the release rate from a similarly sized piece of H200 foam with half of the surfaces sealed with a 0.5-mm-thick layer of PVC. The PVC sheet was sealed to the H200 foam via a standard solvent-welding technique for PVC. The ammonia release rate from the uncovered foam is 2 to 3 times that of the foam with half of the surfaces covered. This result demonstrates the ammonia release rate can be adjusted downward simply by sealing a fraction of the monolith surface. Increasing the release rate can similarly be accomplished by using a monolith geometry with a higher surface-area-to-volume ratio such as a thin slab rather than a cube or sphere. A planar architecture for the ammonia storage foam, and subsequently the device, should permit more compact packaging into hydrogen generation units, for example. Such packaging should also lend itself well to high volume production, as the foams can be incorporated into a external box-type enclosure (as opposed to a cylindrical vessel) in a cartridge type fashion. Such a packaging method also leads to low cost and would allow for periodically swapping the spent cartridges out with a fresh one.

Another important feature of the planar architecture of the storage device is stacking to enable scale-up of the storage device without violating the safe discharge rates (0.18 g/min for ammonia). As mentioned earlier, the targeted delivery rate of ammonia from the storage device is 0.18 g/min which is sufficient to power a 20 W to 30 W fuel cell power system. When the delivery rate of ammonia needs to be increased beyond the safe limit of 0.18 g/min per storage unit, for example when 1 g/min is required to power a 100-200 W fuel cell power system, several planar storage devices (about 5, for example) or cartridges can be arranged in a stacked fashion and manifolded together to supply the desired ammonia flow rate without violating the safe discharge rates for each cartridge.

As mentioned earlier, one embodiment of the storage device allows the encapsulation of the foam in a non-permeable material. For practical use, it may be advantageous to add on an additional layer of safety by enclosing the encapsulated foam in a thin metal enclosure. When a stacked architecture is adopted, one metal enclosure may incorporate several encapsulated foam cartridges that leads to a compact, lightweight and safe storage device while permitting the flexibility to change the ammonia delivery rate to an end-use device such as a fuel cell power system, as desired.

If the foam cartridge is not encapsulated but is enclosed in a metal enclosure directly, the stacking methods described above and benefits thereof would also be applicable.

When the storage device is in a cylindrical vessel form, several vessels may be manifolded together to increase the delivery rate of ammonia without violating the safe delivery rate of each unit.

When the storage device is a cylindrical vessel form as in FIG. 1, it would be preferable to attach or connect the foam to the neck of the vessel prior to seam welding the neck to the cylindrical body. This method should lend itself well to high volume production.

Based on analyses and experimental observations, H200 foam represents a very promising exemplary ammonia-storage material. Other materials tested are contemplated for application for storage of ammonia or other liquefied gases (e.g., butane and propane).

The embodiments disclosed herein demonstrate the feasibility of the closed-cell foam monolith approach for safe storage of volatile material, particularly safe ammonia storage. Demonstration of feasibility requires showing how this approach can meet, in an aspect, the ammonia release-rate requirements as well as targeted ammonia storage density. The disclosure herein provides exemplary embodiments that demonstrate scalability between the 3-cm cube test samples and larger monolith dimensions.

Exemplary ammonia storage systems described in this section demonstrate controlled release of ammonia from closed-cell foam monoliths of utilitarian size.

Figure 8:
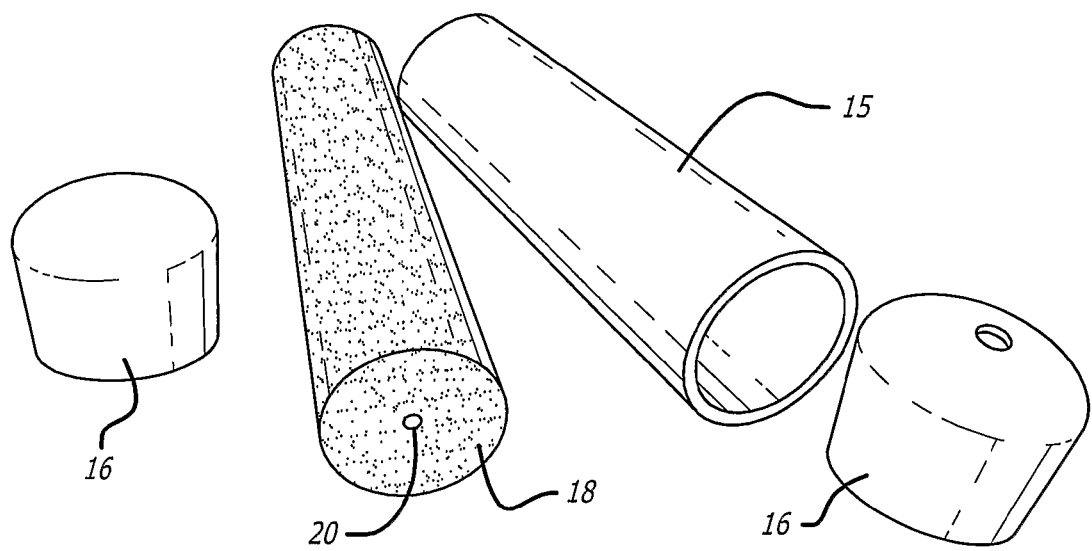
FIG. 8 depicts particular components of an exemplary PVC tank storage apparatus.

Two exemplary ammonia-storage apparatuses are disclosed, based on DIAB's H200 foam. Rectangular blocks of H200 foam were cut to a cylindrical shape 18 with a diameter of 5 cm (2 in.) and a length of 17 cm (6.7 in.). A 3-mm-dia. hole 20 was bored down the center of each cylinder. Alternative hole sizes and/or multiple channels can be used as necessary, but these devices employed a single channel. FIG. 8 shows an exemplary cylindrical piece along with a section of PVC pipe 15 and PVC end-caps 16, which were used in the all-PVC storage apparatus discussed below.

Figure 9:
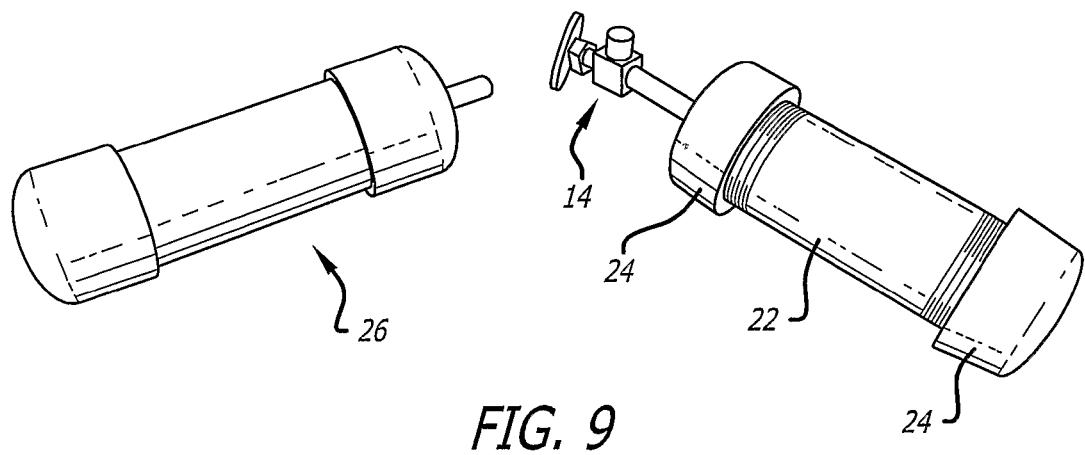
FIG. 9 depicts steel and PVC embodiments, in accordance with the teachings of the present disclosure.

Two volatile storage apparatus designs have been constructed and tested (FIG. 9). Both use identical monoliths of H200 foam (i.e., 5-cm-dia. cylinders, 17-cm long). One embodiment uses a steel pipe 22 and steel end caps 24 to form the "tank" surrounding the foam monolith, and the other, 26, uses a PVC pipe and end caps to form the "tank" (e.g. FIG. 8) The two embodiments also differ in that the monolith in the PVC unit is sealed (by solvent welding a sheet of PVC to the external surface of the monolith) such that ammonia can only enter and exit the monolith via the surface formed by the 3-mm-dia. hole through the center of the monolith. The steel-pipe unit has all surfaces of the monolith exposed. This difference in monolith sealing was implemented to demonstrate how changes in the exposed surface area can be used to control the ammonia release rate. Both embodiments are shown in FIG. 9.

Both embodiments were connected directly to a heated (27° C.) tank of liquefied anhydrous ammonia. Ambient temperature remained at about 20-22° C., so liquid ammonia accumulated inside the prototypes under a pressure of 140 psig. The vapor pressure of ammonia is 115 psig at 21° C. and 140 psig at 27° C. Over time, the liquid ammonia diffused into the H200 foam monoliths inside both volatile storage apparatus. The embodiment having the PVC outer "tank" was filled for 68 hours before it was disconnected from the heated ammonia tank. Two identical steel-pipe prototypes were built and tested. One of the steel-pipe embodiments was filled for 48 hours and the other was filled for 68 hours.

Figure 10:
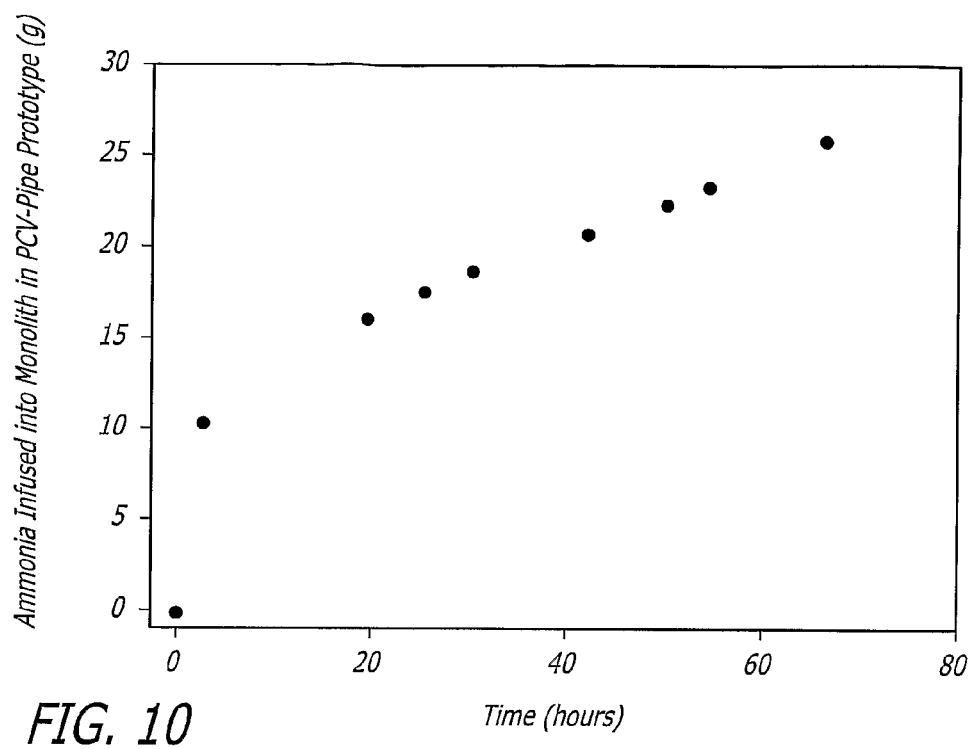
FIG. 10 shows an ammonia fill rate for a PVC tank embodiment.

The mass of each tank was monitored during the filling process. None of the tanks had reached maximum capacity by the time filling was terminated, as was evidenced by fact that the mass of each tank continued to increase. FIG. 10 shows the mass-gain data for the exemplary volatile storage apparatus having the outer "tank." After 68 hours, the 360 $cm^3$ cylindrical monolith (mass=71 g) had absorbed 25 g of ammonia. This represents an average capacity of 0.07 g $NH_3$/ $cm^3$ (26 wt.-% capacity). From the 3-cm-block tests described above, we know the ammonia capacity of this foam is up to 0.50 g $NH_3/cm^3$, so the foam monolith in the PVC "tank" embodiment was likely less than one-seventh full when filling was terminated. The steel-pipe prototype filled for 48 hours reached an average storage density of 0.12 g $NH_3/cm^3$, and the steel-pipe prototype filled for 68 hours reached 0.15 g $NH_3/cm^3$.

It should be noted that the foam does not fill uniformly throughout its volume. Instead, the cells nearest the exposed surfaces of the monolith quickly reach capacity, and the cells deeper in the monolith become filled only as ammonia permeates inward from the cells near the surface. Since the monolith fills with ammonia through the same exposed surface area that is involved in the ammonia release, the cells near the surface should be filled to near capacity even if most of the cells deeper in the monolith contain little or no ammonia. Because of this effect, ammonia-release tests using a partially filled monolith are expected to give very similar ammonia release rates to those observed using a fully filled monolith. The release-rate profiles will be similar early in the test, but diverge later with the release rate from the partially filled monolith being lower than that of the (initially) fully filled monolith. It is on this basis that the herein described ammonia release tests using partially filled monoliths are representative of the ammonia release expected from fully filled monoliths.

Figure 11:
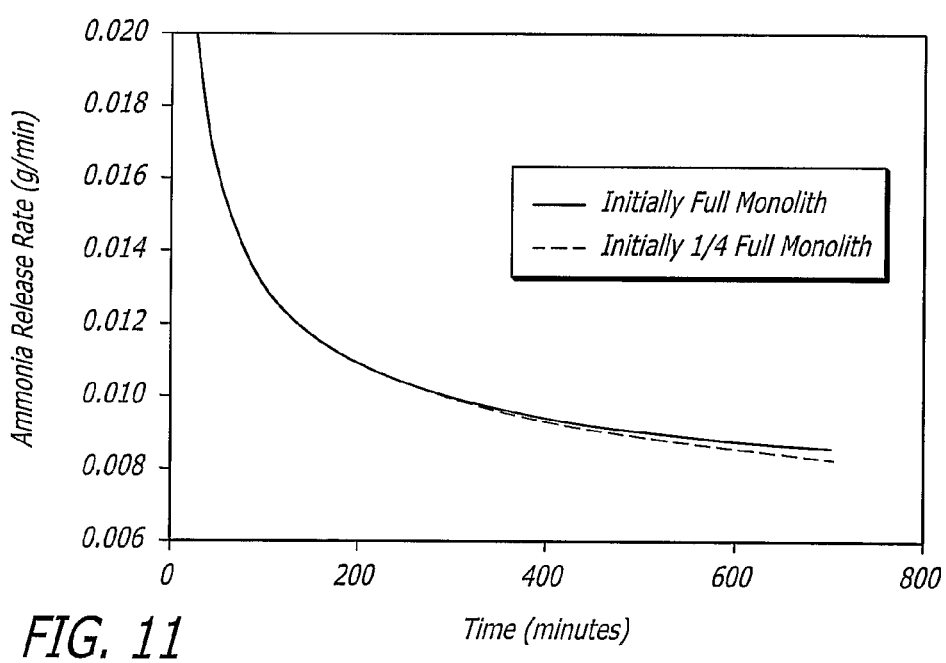
FIG. 11 is a comparison of exemplary ammonia release rates for full and one-quarter-full foam monoliths.

To further illustrate this point, the ammonia release from a monolithic cylinder of a design similar to that used in the PVC "tank" prototype was modeled/simulated. In one case, the simulation assumed the monolith was fully filled to 0.25 g $NH_3/cm^3$ before the tank was depressurized. In the other case, the monolith was assumed to be filled such that the one-quarter of the monolith volume nearest the release surface was initially filled to 0.25 g $NH_3/cm^3$ and the other three-quarters of the monolith was empty. The simulations are compared in FIG. 11. Significant difference in the predicted release rates is not evident until nearly 7 hours have elapsed All three embodiments were tested using the same procedure used to test the 3-cm cube samples. At time=0, a valve on the tank was opened and the ammonia allowed to escape while the mass of the exemplary tank was monitored. The ammonia release rate data for both steel-pipe embodiments are shown in FIG. 12. Also included are the results of a numerical model simulation for the monolith geometry used for the steel-pipe embodiments. Agreement between the model/simulation and experiment is good.

Both prototypes show similar release-rate profiles even though the second unit started with a higher ammonia loading. This is consistent with the argument above and FIG. 11.

The steel-pipe embodiments exhibit ammonia release rates on the right order of magnitude (i.e., about 0.1 to 1.0 g/min), and higher or lower release rates can be obtained from alternative monolith geometries. The PVC tank embodiment was built to demonstrate the reduction in ammonia release rate obtained when most of the monolith surface is sealed. In the case of the PVC prototype, only the 3-mm-dia. hole through the axial center of the cylinder was left unsealed. The ammonia release data for the exemplary PVC tank embodiment are provided in FIG. 13. The release rates for the PVC tank embodiment are about a factor of 5 lower than those observed from the steel-pipe embodiments. Based on the numerical modeling for this embodiment, expected release rates to be about a factor of 10 lower.

The results of the PVC tank embodiment tests show the ammonia release rate can be controlled not only by adjusting the foam monolith geometry, but also by selectively sealing a fraction of the foam monolith surface area.

The PVC tank embodiment also demonstrates a relatively low-weight system for storing volatiles, ammonia particularly, even though no particular effort was made to minimize the mass of the PVC "tank" surrounding the monolith. This embodiment has an ammonia capacity of up to about 180 g. The exemplary embodiment contains 364 $cm^3$ of monolith, which has a mass of 71 g. The PVC pipe/tank and end caps have a combined mass of 340 g. The total mass of this embodiment is 420 g. Thus, the effective storage density is up to 30 wt % (mass of ammonia divided by mass of ammonia plus storage system). Significant increases in this storage density can be made and are contemplated.

FIGS. 14 and 15 show additional exemplary volatile compound release rates. FIG. 14 shows the release of propane gas from an aluminum tank filled with R82.110 polyetherimide closed-cell foam from Alcan Baltek Corporation (Northvale, N.J.). The R82.110 foam has a bulk density of 110 $kg/m^3$. Also shown are data for propane release from a titanium tank containing no foam materials. The data show a rapid release of propane from the titanium tank and a slow, controlled release from the tank containing the R82.110 foam. Polyetherimide foam is not chemically compatible with ammonia, but it is compatible with hydrocarbon volatiles such as propane and butane.

FIG. 15 shows the slow release of propane from a sample of Alporas® closed-cell aluminum foam from Gleich (Kaltenkirchen, Germany). This foam has a bulk density of about 270 $kg/m^3$ and is made from aluminum metal and is chemically compatible with propane, butane, anhydrous ammonia, and many other volatiles.

Safe storage of volatiles, for example ammonia, in closed-cell foam monoliths is a feasible approach based on test results.

The present disclosure shows that high storage densities and low ammonia-release rates are achieved, for example, 2.5 g $NH_3$ per gram of monolith (equivalent to 0.50 g $NH_3/cm^3$ of monolith).

Modeling/simulation implies volatile compound release rates can be conveniently controlled by appropriate selection of monolith geometry and/or sealing a fraction of the monolith surface. Experimental results confirm this.

Exemplary costs include 32 liters of DIAB H200 foam for $800. A system storing 500 g of ammonia will require 1 to 2 liters of foam, so foam cost is anticipated to be between $25 and $50 per storage tank. Thus the present disclosure provides for a very cost-effective method and apparatus for safely storing volatile compounds, including but not limited to, ammonia, butane, propane and other compounds.

The closed-cell foam monolith approach is attractive because of its simplicity, no heat or power is required to induce release of ammonia to a fuel processor, load following requires no changes to the storage system, and ammonia for example, can be supplied at relatively high pressures (ca. 60 psig) without a significant sacrifice in system safety.

The disclosures of each and every publication and reference cited herein are incorporated herein by reference in their entirety.

The present disclosure has been explained with reference to specific embodiments. Other embodiments will be apparent to those of ordinary skill in the art in view of the foregoing description.

REFERENCES

Appleby, A. J., and F. R. Foulkes. 1989. *Fuel Cell Handbook* Van Nostrand Reinhold, New York.

Blomen, L., and M. N. Mugerwa. 1993. *Fuel Cell Systems*. Plenum Press, New York.

Bloomfield, D. P., V. J. Bloomfield, P. D. Grosjean, and J. W. Kelland. 1995. *Mobile Electric Power*. Analytic Power Corp., NTIS Report ADA296709.

Burchell, T. and M. Rogers. 2000. "Low Pressure Storage of Natural Gas for Vehicular Applications." SAE Technical Paper Series. 2000-01-2205. SAE, Warrendale, Pa.

Hiemenz, P C. 1986. *Principles of Colloid and Surface Chemistry*. 2nd ed. Marcel Dekker, Inc. New York.

Nielsen, A. 1995. *Ammonia: Catalysis and Manufacture*. Springer-Verlag. London.

Pilon, L., A. G. Fedorov, and R. Viskanta. 2000. "Gas Diffusion in Closed-Cell Foams." *Journal of Cellular Plastics*. 36:451-474

Powell, M R. M S Fountain, C J Call, A S Chellappa. 2002. "Ammonia-Based Hydrogen Generation for Fuel Cell Power Supplies." Army Science Conference 2002, Orlando, Fla. Dec. 2-5, 2002.

Powell, M R. M. Fountain, and C J Call. 2001. "Ammonia-Based Hydrogen Generator for Portable Fuel Cells." *Proceedings international Conference on Microreaction Technologies (IMRET 5)*. 2001.

The invention claimed is:

1. A method for storing volatiles under pressure, comprising;
    providing a storage apparatus, wherein said storage apparatus includes an outer portion and a foam component, wherein said foam component fills substantially all of an inner space defined by said outer portion;
    connecting said storage apparatus to a source for providing a volatile, whereby said volatile is stored within closed cells of said foam component; and
    conducting said volatile from said source into said storage apparatus, whereby release of said volatile from said foam component is restricted by a need for said volatile to diffuse through said closed cells of said foam component.

2. The method of claim 1, wherein said closed cells of said foam component have low, but nonzero, cell-wall permeability.

3. The method of claim 1, wherein said volatile is at least one of a liquid or gas or combination thereof.

4. The method of claim 1, wherein said volatile is at least one of ammonia, butane and propane.

5. The method of claim 1, wherein at least a portion of a surface of said foam component is sealed.

6. The method of claim 1, wherein said foam component is a monolithic structure.

7. The method of claim 1, wherein said foam component is of a ceramic foam.

8. The method of claim 1, wherein said foam component is selected from the group consisting of: alumina ceramic foam, silicon oxycarbide foam, aluminum foam, syntactic foam, glass microspheres with ceramic or cementitious binders, glass foam, ceramic/carbon foam, graphite foam.

* * * * *